US011006172B2

(12) United States Patent
Patel et al.

(10) Patent No.: US 11,006,172 B2
(45) Date of Patent: May 11, 2021

(54) DYNAMIC ADVERTISEMENT INSERTION AND MONITORING

(71) Applicant: Charter Communications Operating, LLC, St. Louis, MO (US)

(72) Inventors: Vipul B. Patel, Great Falls, VA (US); Jon C. Honhart, Evergreen, CO (US); Justin O. Tidwell, Greenwood Village, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 141 days.

(21) Appl. No.: 15/982,123

(22) Filed: May 17, 2018

(65) Prior Publication Data
US 2019/0356944 A1    Nov. 21, 2019

(51) Int. Cl.
| | | |
|---|---|---|
| *H04N 21/431* | (2011.01) | |
| *H04N 21/466* | (2011.01) | |
| *H04N 21/81* | (2011.01) | |
| *H04N 21/454* | (2011.01) | |
| *H04N 21/45* | (2011.01) | |

(52) U.S. Cl.
CPC ....... *H04N 21/4316* (2013.01); *H04N 21/454* (2013.01); *H04N 21/4532* (2013.01); *H04N 21/4667* (2013.01); *H04N 21/812* (2013.01)

(58) Field of Classification Search
CPC ........... H04N 21/4316; H04N 21/4667; H04N 21/454; H04N 21/4532; H04N 21/812; H04N 21/2668; H04N 21/44204; H04N 21/252; H04N 21/25866
See application file for complete search history.

(56) References Cited

U.S. PATENT DOCUMENTS

| | | | | |
|---|---|---|---|---|
| 7,296,091 B1 * | 11/2007 | Dutta | ...................... | H04H 20/42 370/331 |
| 8,302,120 B2 * | 10/2012 | Ramaswamy | ......... | G06Q 30/02 725/10 |
| 2004/0005900 A1 * | 1/2004 | Zilliacus | ............ | H04N 21/4758 455/466 |
| 2012/0023522 A1 * | 1/2012 | Anderson | .............. | H04N 7/173 725/35 |

(Continued)

*Primary Examiner* — Nathan J Flynn
*Assistant Examiner* — Christine A Kurien
(74) *Attorney, Agent, or Firm* — Armis IP Law, LLC

(57) ABSTRACT

A communications system includes content distribution hardware operable to detect presence of a window in a video stream in which to insert an advertisement. Multiple viewers receive and view the video stream. Advertisement management hardware in the communications system receives notification of the window as well as attributes of the viewers receiving the video stream. Based on the attributes associated with viewers, the advertisement manager hardware selects a particular advertisement suitable for the viewers amongst multiple advertisements to insert in the window. The content distribution hardware inserts the selected advertisement in the window for distribution to the multiple viewers. During distribution of the advertisement in the window, if desired, the content distribution hardware monitors further use of the multiple communication devices to detect if any of the communication devices discontinue receiving the video stream during the window of time.

39 Claims, 10 Drawing Sheets

(56) References Cited

U.S. PATENT DOCUMENTS

| | | | | |
|---|---|---|---|---|
| 2012/0110618 A1* | 5/2012 | Kilar | ................ | H04N 7/17318 |
| | | | | 725/34 |
| 2013/0144709 A1* | 6/2013 | Narasimhan | ........... | G06Q 30/02 |
| | | | | 705/14.41 |
| 2014/0089980 A1* | 3/2014 | Alexander | ......... | H04N 21/4314 |
| | | | | 725/42 |
| 2016/0205443 A1* | 7/2016 | Ghadi | ................ | H04N 21/6125 |
| | | | | 725/34 |

* cited by examiner

| SUB. DOMAIN | TUNED TO CHANNEL | VIDEO STREAM |
|---|---|---|
| 170-1 | 511 | 111-2 |
| 170-2 | 511 | 111-2 |
| 170-3 | 568 | 168-2 |
| 170-4 | 511 | 111-2 |
| 170-5 | 599 | 199-2 |
| ... | | ... |

CCI 161-1

FIG. 2

LEGEND 320

| PROFILE CODE | DESCRIPTION |
| --- | --- |
| A | CHILDREN IN FAMILY |
| B | WATCHES SPORTS SHOWS |
| C | LIKES COMEDY |
| D | LIKES REALITY SHOWS |
| E | WATCHES NEWS |
| ... | ... |

PI 161-2

| SUB. DOMAIN | PROFILE |
| --- | --- |
| 170-1 | A, C, D |
| 170-2 | A, D |
| 170-3 | B, C, E |
| 170-4 | H, K |
| 170-5 | A, B, C |
| ... | ... |

FIG. 3

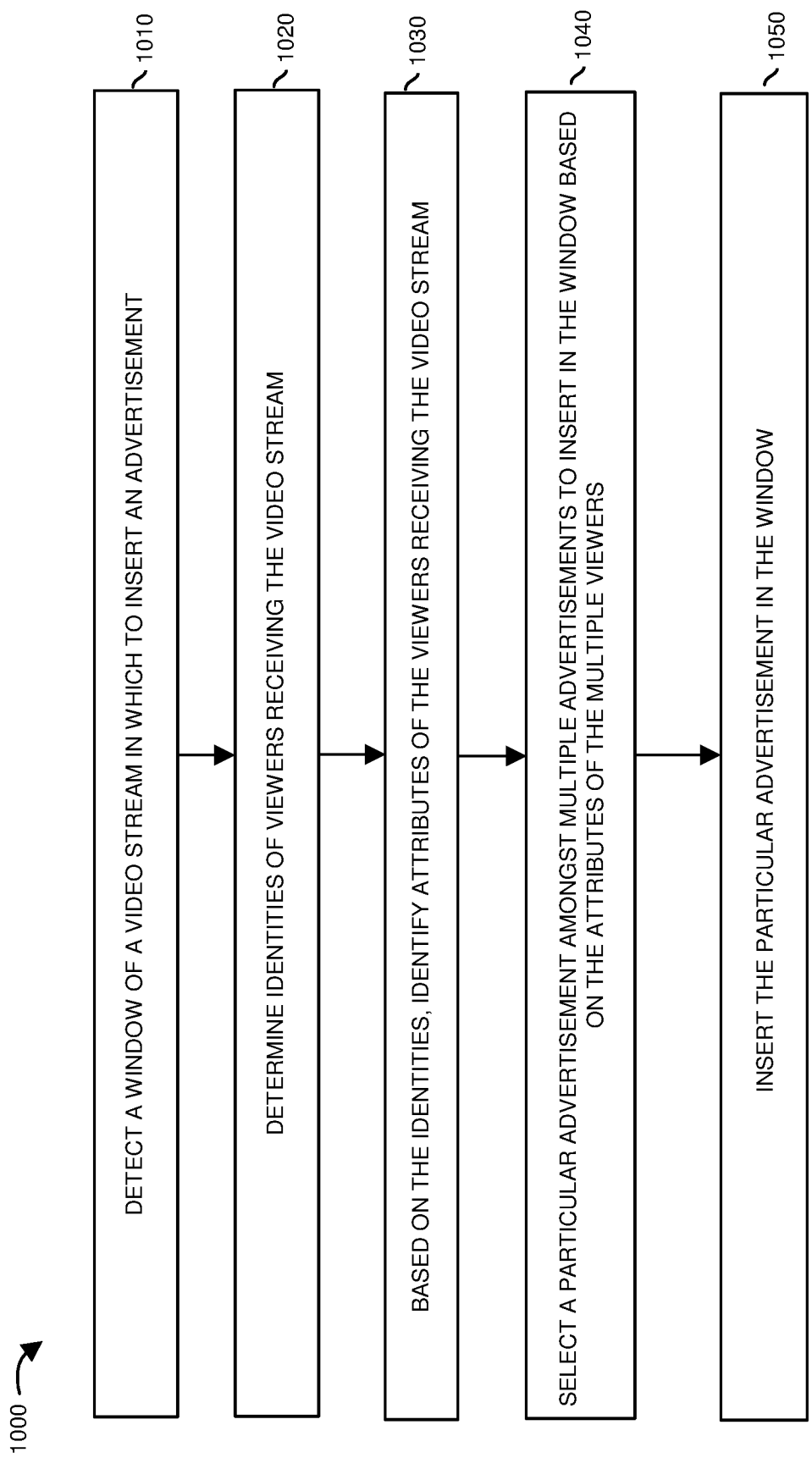

DYNAMIC ADVERTISEMENT INSERTION AND MONITORING

BACKGROUND

One source of revenue for commercial television broadcasters is the sale of broadcast time to advertisers. For example, as is well known, most television programs include windows of time in which a commercial broadcaster inserts advertisements for viewing by a respective viewers tuned to a particular channel.

In certain cases, advertisers attempt to target specific advertisements to viewer segments that are likely to be most receptive to the message captured by the advertisement. One way to target advertisements to viewers includes identifying what types of viewers are associated with specific television programs. For example, the commercial broadcaster may assume that viewers watching a fishing program are more likely to response favorably to advertisements directed to sale of fishing equipment. Accordingly, the subject of the video stream broadcasted may dictate to some extent what advertisements should be inserted in the available time slots.

Another way of targeting specific viewing audiences includes selecting advertisements based on a geographical region in which the video stream and corresponding advertisements are broadcasted. The assumption is that viewers in one local or regional area are more likely to be receptive to an advertisement's message than viewers in a different area.

BRIEF DESCRIPTION OF EMBODIMENTS

This disclosure includes the observation that distribution of advertisements in video streams is often inefficient and ineffective because the distributed advertisements typically are not correctly targeted to an appropriate audience of multiple viewers.

Embodiments herein provide novel ways of providing improved advertisement insertion for multiple viewers. Embodiments herein further include monitoring viewer response to the advertisements to determine their effectiveness.

More specifically, in one embodiment, content distribution hardware in a communications system is operable to detect presence of a window in a video stream in which to insert an advertisement. Multiple viewers receive and view the video stream. Advertisement management hardware in the communications system receives notification of the (upcoming) window as well as attributes of the viewers receiving the video stream. Based on the attributes and/or other suitable information such as the genre in which the video stream is classified, the advertisement management hardware selects a particular advertisement amongst multiple advertisements to insert into an upcoming detected window. The content distribution hardware inserts the selected advertisement into the window for distribution to the multiple viewers receiving the video stream.

In accordance with further embodiments, during distribution of the advertisement in the window, the content distribution hardware or other suitable resource monitors the multiple communication devices and subscriber domains to detect if any of the communication devices discontinue receiving the video stream during the window of time in which the advertisement is inserted.

The attributes of the viewers (communicated to the advertisement management hardware) can be derived from or include any suitable information such as: i) a numerical value indicating a number of subscribers tuned to receive the video stream, ii) a profile of a geographical region in which the viewers reside, and iii) profiles of the viewers operating communication devices tuned to the video stream, etc.

In one embodiment, each of the profiles assigned to a viewer or subscriber domain indicates an interest of a corresponding viewer to which profile is assigned.

In accordance with further embodiments, the content distribution hardware can be configured to analyze the viewer attributes and derive information indicating a dominant type of viewer profile amongst multiple viewers. In such an instance, the advertisement management hardware is operable to use the dominant type of viewer profile information as a basis to select an advertisement for insertion. Thus, if the dominant profile of the viewers is a propensity to watch sports, and it is know that the viewer also has children, the profile information capturing this notifies the advertisement management hardware of possible advertisements to select for insertion.

In one embodiment, the viewer attributes received by the advertisement management hardware includes or indicates a profile or classification associated with each of the viewers. In such an instance, the advertisement management hardware selects the particular advertisement from a pool of multiple possible advertisements based on a collection of different profiles assigned to the multiple viewers.

In accordance with further embodiments, the video stream is a title of content (such as a movie, TV program, etc.) transmitted over a shared communication link to multiple subscriber domains in a network environment. The attributes of the viewers are communicated to the advertisement management hardware during transmission of the video stream (such as title of content) over the shared communication link. In one embodiment, the viewer information is collected and the corresponding viewer attributes are communicated to the advertisement management hardware while the video stream is transmitted to the viewers such as subsequent to detecting the window but prior to occurrence of the window in the video stream. Thus, the selection of the particular advertisement to insert in the window can be made on relatively short notice (such as within a few milliseconds, seconds, minutes, etc.).

Further embodiments herein include detecting identities of the multiple viewers receiving the video stream; mapping identities of the multiple viewers to multiple profiles assigned to the multiple viewers; and utilizing the multiple profiles to identify the attributes of the viewers. As previously discussed, the advertisement management resource uses the attributes as indicated by the viewer profiles as a basis to select the particular advertisement for insertion ion the window.

In accordance with still further embodiments, the video stream can be transmitted over a first channel of a shared communication link to which the multiple viewers are tuned or retrieve respective content. To determine an effectiveness of the particular advertisement, a monitor resource associated with the content distribution hardware monitors subsequent tuning commands by the viewers during the window in which the particular advertisement is inserted. If the monitor resource detects that the viewers change to a different channel (than the channel on which the video stream and particular advertisement is conveyed), then it is known that such viewers do not wish to view the advertisement, possibly or presumably because it is undesirable.

In one embodiment, while transmitting the particular advertisement in the video stream to the viewers tuned to a channel on which the video stream is received, the monitor resource monitors which of the viewers discontinues tuning to the channel to receive the video stream. If desired, the content distribution hardware or other suitable resource produces viewer information indicating a portion of the viewers that receive the particular advertisement over the channel in its entirety from a start of the window to an end of the window.

In accordance with further embodiments, the content distribution hardware or other suitable resource can be configured to communicate the viewer information to an advertisement sponsor that pays a fee to distribute the particular advertisement over the channel (such as a linear broadcast channel). The advertisement management resource uses predetermined criteria (advertisement campaign priority selection) as a basis which of multiple advertisements is most suitable to insert in a respective time slot (window). Thus, selection can occur dynamically and near a time of the window.

Further embodiments herein include producing a metric or metrics indicating viewer details such as: i) how many of the communication devices discontinues receiving the video stream during the window of time; ii) a rate at which the multiple communication devices discontinue receiving the video stream during the window of time, etc.

Such viewer metrics generated by the monitor resource (or other suitable resource) can include a first metric and a second metric. In one embodiment, the first metric indicates how many of the communication devices receiving the video stream at the beginning of the window continues to receive the video stream at a first instant in time in the window. The second metric indicating how many of the communication devices receiving the video stream at the beginning of the window continues to receive the video stream at a second instant in time in the window.

In accordance with further embodiments, the monitor resource produces one or more metrics indicating a degree of interest of viewers viewing the advertisement in the window of the video stream based on whether the communication devices discontinue receiving the video stream such as due to respective channel changes by the viewers. The generated metrics can be used as a basis in which to control subsequent transmission of the advertisement over the channel. For example, if it is known that viewers watching a video stream have a high rate of changing to a different channel during playback of a respective selected advertisement in a time slot, it is known that the corresponding advertisement communicated in the window is undesirable.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate content distribution and monitoring as discussed herein. The instructions, when executed by computer processor hardware, cause the computer processor hardware (such as one or more co-located or disparately processor devices) to: detect a window in a video stream in which to insert an advertisement, the video stream viewed by multiple viewers receiving the video stream; provide notification of the window to advertisement management hardware; communicate attributes of the viewers receiving the video stream to the advertisement manager hardware, the advertisement manager hardware operable to select a particular advertisement amongst multiple advertisements to insert in the window based on the attributes of the multiple viewers; and receive a response from the advertisement management hardware, the response indicating the particular advertisement to insert in the window.

Another embodiment herein includes a computer readable storage medium and/or system having instructions stored thereon to facilitate content distribution and monitoring as discussed herein. The instructions, when executed by computer processor hardware, cause the computer processor hardware (such as one or more co-located or disparately processor devices) to: receive notification of an advertisement to insert in a window of a video stream transmitted over a channel; insert the advertisement into the window of the video stream, the video stream communicated over the channel to multiple communication devices; monitor the multiple communication devices to detect which of the communication devices discontinues receiving the video stream during the window of time.

Another embodiment herein includes a computer readable storage medium and/or system having instructions stored thereon to facilitate content distribution and monitoring as discussed herein. The instructions, when executed by computer processor hardware, cause the computer processor hardware (such as one or more co-located or disparately processor devices) to: receive notification of a window of a video stream transmitted over a channel; identify attributes of the viewers receiving the video stream; select a particular advertisement amongst multiple advertisements to insert in the window based on the attributes of the multiple viewers; and insert the particular advertisement in the window.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 2 is an example diagram illustrating content consumption information according to embodiments herein.

FIG. 3 is an example diagram illustrating profile information assigned to different subscriber domains according to embodiments herein.

FIGS. 8-10 are example diagrams illustrating methods according to embodiments herein.

Figure 1:
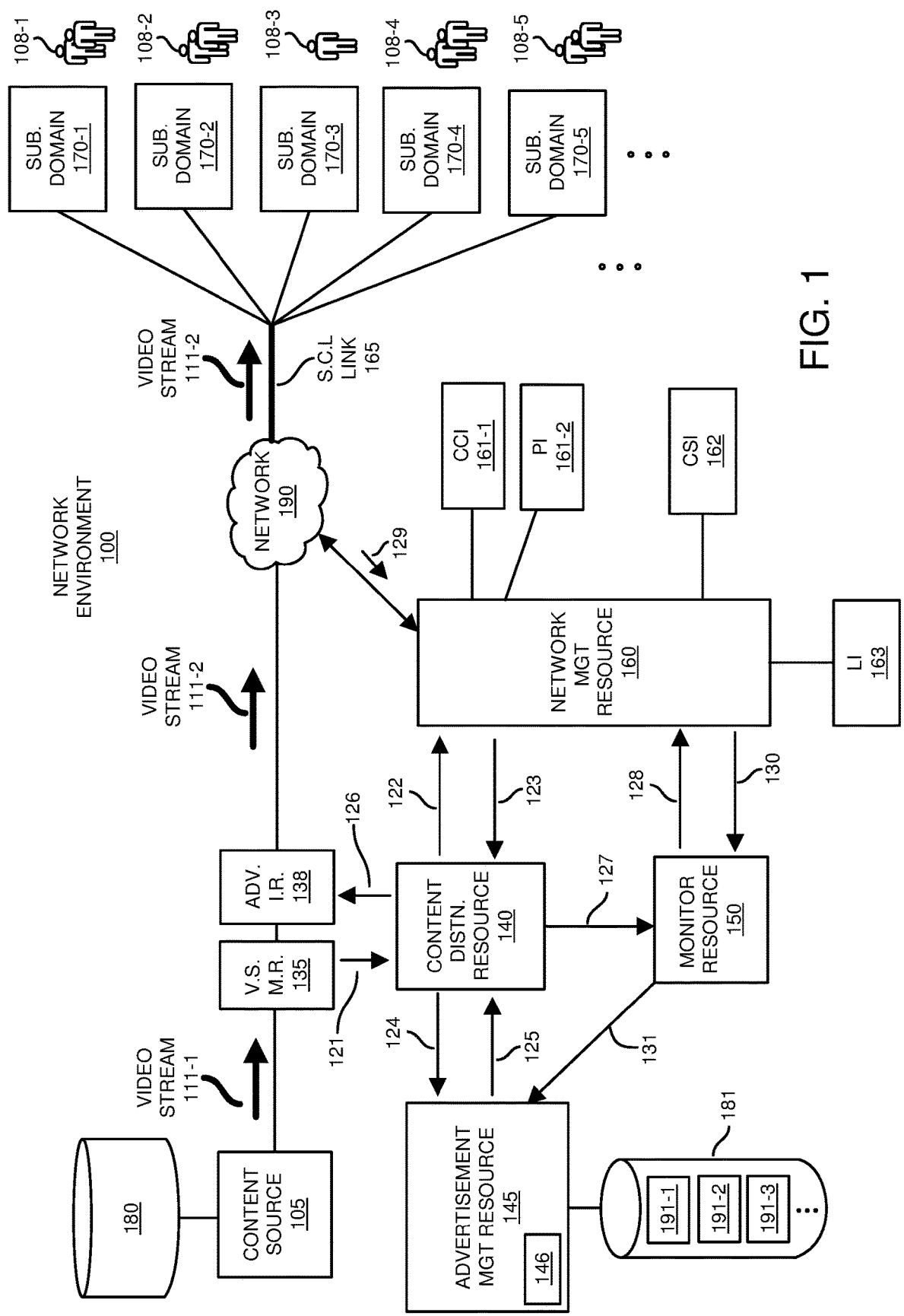
FIG. 1 is an example diagram illustrating a network environment supporting dynamic advertisement insertion and monitoring according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed in more detail below, content distribution hardware in a communications system is operable to detect presence of a window in a video stream in which to insert an advertisement. Multiple viewers receive and view the video stream. Advertisement management hardware in the communications system receives notification of the window as well as attributes of the viewers receiving the video stream. Based on the attributes, the advertisement manager hardware selects a particular advertisement amongst multiple advertisements to insert in the window. The content distribution hardware inserts the selected advertisement into the window for distribution to the multiple viewers. During distribution of the advertisement in the window, the content distribution hardware monitors the multiple communication devices to detect if any of the communication devices (or subscriber domains) discontinue receiving the video stream during the window of time.

Now, more specifically, FIG. 1 is an example diagram illustrating a network environment supporting dynamic advertisement insertion and monitoring according to embodiments herein.

In this example embodiment, network environment 100 includes content source 105, repository 180, video stream management resource 135, advertisement insertion resource 138, content distribution resource 140, advertisement management resource 145, repository 181, monitor resource 150, network management resource 160, network 190, and subscriber domains 170 (such as subscriber domain 170-1, subscriber domain 170-2, subscriber domain 170-3, etc.). Note that any of these resources include hardware and/or corresponding software to carry out functions as discussed herein.

In this example embodiment, the content source 105 retrieves content from repository 180 for distribution over shared communication link 165. As shown, content source 105 transmits video stream 111-1 downstream towards network 190. Video stream 111-1 includes one or more windows in which to insert advertisements and can be transmitted in any suitable format.

As its name suggests, the video stream monitor resource 135 monitors video stream 111-1 for upcoming windows in which to dynamically insert selected advertisements. As further discussed herein, the advertisement management resource 145 selects amongst multiple advertisements 191 for insertion in the one or more upcoming windows.

In response to detecting presence of a respective window in a video stream 111-1, the video stream monitor resource 135 conveys communications 121 to content distribution resource 140. In one embodiment, the communications 121 indicate to the content distribution resource 140 that video stream 111-1 will include a respective window in which to insert a selected advertisement. The video stream management resource 135 can be configured to indicate parameters of the window to the content distribution resource 140 such as the size of the window, when the window will occur in the video stream 111, etc.

In response to receiving notification of the window in video stream 111-1, via communications 122, the content distribution resource 140 requests that the network management resource 160 provide information about viewers tuned to receive the video stream 111-2.

In one embodiment, in response to receiving the request for information (attributes) associated with the viewers tuned to the video stream 111-2, the network management resource 160 accesses and processes content consumption information 161-1, profile information 161-2, etc., an example of which is shown in FIGS. 2 and 3.

FIG. 2 is an example diagram illustrating content consumption information according to embodiments herein.

In this example embodiment, the content consumption information 161-1 indicates current consumption of content by each of multiple subscriber domains 170. For example, content consumption information 161-1 indicates that subscriber domain 170-1 and corresponding viewers 108-1 are tuned to receive and/or view video stream 111-2 conveyed over channel 511 of the shared communication link 165; content consumption information 161-1 indicates that subscriber domain 170-2 and corresponding viewers 108-2 are tuned to receive and/or view video stream 111-2 conveyed over the channel 511 of the shared communication link 165; content consumption information 161-1 indicates that subscriber domain 170-3 and corresponding viewers 108-3 are tuned to receive and/or view video stream 168-2 conveyed over the channel 568 of the shared communication link 165; content consumption information 161-1 indicates that subscriber domain 170-4 and corresponding viewers 108-4 are tuned to receive and/or view video stream 111-4 conveyed over the channel 511 of the shared communication link 165; content consumption information 161-1 indicates that subscriber domain 170-5 and corresponding viewers 108-5 are tuned to receive and/or view video stream 199-2 conveyed over the channel 511 of the shared communication link 165; and so on.

In one embodiment, content consumption information 161-1 is constantly updated such that the corresponding information indicates current content consumption by viewers at all times.

Via content consumption information 161-1, the network management resource 160 is able to identify which of multiple subscriber domains, at any given time, are tuned to receive each of multiple video streams available over shared communication link 165.

FIG. 3 is an example diagram illustrating profile information assigned to different subscriber domains according to embodiments herein.

In addition to having access to the content consumption information 161-1, the network management resource 160-1 also has access to profile information 161-2 to determine attributes of respective viewers.

Profile information 161-2 includes a mapping of identities of subscriber domains and corresponding viewers to corresponding assigned one or more profiles. For example, subscriber domain 170-1 and corresponding viewers are assigned viewer profile codes A, C, and D; subscriber domain 170-2 and corresponding viewers are assigned viewer profile codes A, and D; subscriber domain 170-3 and corresponding viewers are assigned viewer profile codes B, C, and E; subscriber domain 170-4 and corresponding viewers are assigned viewer profile codes H, and K; subscriber domain 170-5 and corresponding viewers are assigned viewer profile codes A, B, and C; and so on.

As shown in legend 320, the profile codes of profile information 161-2 indicate attributes of the corresponding subscriber domain. For example, code A indicates that a corresponding assigned subscriber domain likely includes children in a respective family; code B indicates that a corresponding assigned subscriber domain watches many sports programs and is likely interested in sports; code C indicates that the respective subscriber domain typically retrieves and plays back comedy content; code D indicates that the corresponding subscriber domain often retrieves and plays back reality shows; code E indicates that the viewers in a respective subscriber domain typically watch news programs; and so on.

The identification of codes in which to assign to subscriber domains can occur in any suitable manner. For example, a service provider of network environment 100 may know from prior content requests or a type of content that is typically communicated to a respective subscriber domain. The type of requested and delivered content serves as a basis of identifying attributes of a respective audience. As an example, if the subscriber domain routinely retrieves and views kids programs, it can be assumed that the viewers in the respective subscriber domain include children. The type of the retrieved kids programs may indicate an age of the children.

As another example, if the subscriber domain routinely retrieves and views sports programs, it can be assumed that the viewers in the respective subscriber domain like sports and potentially are interested in purchase of sports equipment.

As an alternative to deducing profile status for a respective subscriber domain based upon prior content consumption or other known habits, note that a service provider of the network environment 100 may receive survey information (such as direct input) from the respective viewers in a subscriber domain of their viewing interests. This information can be used to assign appropriate one or more profile codes to the subscriber domains.

Via network management resource 160 or other suitable resource, note that further embodiments herein can include detecting identities of the multiple viewers receiving the video stream 111-2 as indicated by the content consumption information 161-1; mapping identities of the multiple viewers as indicated by the content consumption information 161-1 to multiple profiles in profile information 161-2 assigned to the corresponding multiple viewers; and utilizing the multiple profiles (codes) assigned to the multiple viewers currently viewing the video stream 111 to identify the attributes of the viewers. As previously discussed, and as further discussed below, the advertisement management resource uses these identified attributes obtained by the network management resource 160 as indicated by the viewer profiles and the content consumption information as a basis to select the particular advertisement for insertion in the upcoming advertisement window.

Referring again to FIG. 1, in response to requesting network information such as content consumption information and/or profile information via communication 122, the content distribution resource 140 receives communications 123 from the network management resource 160.

In one embodiment, the communications 123 indicate attributes of the corresponding viewers tuned to receive and view video stream 111-2. The network information received in communications 123 can include any suitable information such as attributes (as indicated by the content consumption information 161-1 and profile information 161-2) associated with corresponding viewers tuned to the video stream 111-2. Attributes can include notification of how many subscriber domains receive the video stream 111 and their desired interests.

As further shown via communications 124, the content distribution resource 140 notifies the advertisement management resource 145 of the upcoming window available in video stream 111-1 as well as the attributes of viewers (such as profile and number of viewers). Notification of the presence of the upcoming window can include specifying a duration of time that is available in which to insert a respective advertisement as well as when a respective advertisement must be supplied to fill the window. Additionally, the content distribution resource 140 communicates the network information such as attributes associated with the viewers (such as content consumption information 161-1, profile information 161-2, number of viewers receiving the video stream 111, geographical region in which the viewers/subscriber domains reside, etc.) receiving video stream 111-2 to advertisement management resource 145.

Accordingly, the advertisement manager resource 145 is aware that a window will occur in the video stream 111-1 at sometime in the near future. As further described herein, responsive to the condition of detecting an available window, the advertisement management resource 145 selects one or more advertisements to insert into the window (time slot) based on application of criteria 145 (such as an advertisement campaign) to the received attributes.

In one embodiment, the activation management resource 145 is operable to select an advertisement that delivers a highest review to a service provider providing the content (video stream 111) to the downstream subscriber domains.

In accordance with further embodiments, when selecting an appropriate one or advertisements to insert into the available window, the advertisement management resource 145 applies selection criteria 146 to the received network information indicating content consumption, profile information, etc., associated with the viewers in order to identify which of the advertisements 191 should be selected from the repository 181 for distribution in the respective upcoming window of video stream 111-1.

As previously discussed, the attributes of the viewers as communicated to the advertisement management resource 145 and as used as a basis to select an appropriate one or more advertisements can be derived from or include any suitable information such as: i) a numerical value indicating a number of subscribers tuned to receive the video stream, ii) a profile or identity of a geographical region in which the viewers reside, and iii) profiles of the viewers operating communication devices tuned to the video stream, etc. In one embodiment, each of the profiles indicates an interest of a corresponding viewer to which profile is assigned. The advertisement management resource 145 applies the criteria 146 to select a most appropriate advertisement for insertion in the window.

In accordance with further embodiments, the content distribution hardware can be configured to analyze the viewer attributes and derive information indicating a dominant type of viewer profile of the multiple viewers. In such an instance, the advertisement management hardware is operable to use the dominant type of viewer profile information as a basis to select the particular advertisement. Thus, if the dominant profile of the viewers indicates that a majority of viewers have a propensity to watch sports (for example, a majority of the subscriber domains watching the video stream 111 are assigned a profile of code B as indicated by legend 320), and it is know that the viewer also has children (as indicated by code A assigned to the viewers), the profile information communicates such information to the advertisement management hardware 145.

In one embodiment, the viewer attributes include or indicate a profile or classification associated with each of the viewers. In such an instance, the advertisement management hardware selects the particular advertisement from a pool of multiple possible advertisements 191 based on a collection of different profiles assigned to the multiple viewers. As previously discussed, if the viewer profiles associated with viewers of video stream 111 indicates that the viewers are predominantly of a certain class, then the and 145 selects an advertisement suitable for that class and geographical location of the advertisement zone.

In accordance with further embodiments, note that the video stream 111 is potentially a title of content (such as a movie, TV program, etc.) transmitted over a shared communication link 165 to multiple subscriber domains 170 in the network environment 100. As previously discussed, the attributes of the viewers in subscriber domains 170 are communicated to the advertisement management resource 145 during transmission of the video stream 111 (such as a particular title of content) over the shared communication link 165. The advertisement manager resource 145 selects which of the advertisements 191 to insert in the respective window of the video stream 111 based on current operating conditions (such as received viewer attributes).

In one embodiment, the viewer information (such as content consumption information 161-1, profile information 161-2, and/or any other suitable information) is collected and the corresponding viewer attributes are communicated to the advertisement management resource 145 while the video stream 111 is being transmitted to the viewers in the subscriber domains 170 such as subsequent to detecting the upcoming window and start of transmitting the video stream 111 but prior to occurrence of the window in the video stream 111.

Thus, the selection of the particular advertisement to include in the window can be made on relatively short notice (such as within a few milliseconds, seconds, or minutes) before the window actually occurs in the video stream 111 and at least a portion of the corresponding content in the video stream 111 already has been transmitted over the shared communication link 165 to the subscriber domains.

In general, in accordance with still further embodiments, the video stream 111 can be transmitted over a first channel (such as channel 511) of a shared communication link 165 to which the multiple viewers (subscriber domains) are tuned to receive or retrieve the video stream 111.

To determine an effectiveness of the particular advertisement inserted in a window, network management resource 160 or other suitable resource associated with the content distribution resource 140 monitors subsequent tuning commands by the viewers during the window 450 in which the selected advertisement is inserted. In general, if the resource monitoring feedback 129 detects that the viewers change to a different channel than the channel 511 on which the video stream 111 and selected advertisement are conveyed, then it is known that such viewers do not wish to view the advertisement, possibly because it is undesirable.

Figure 4:
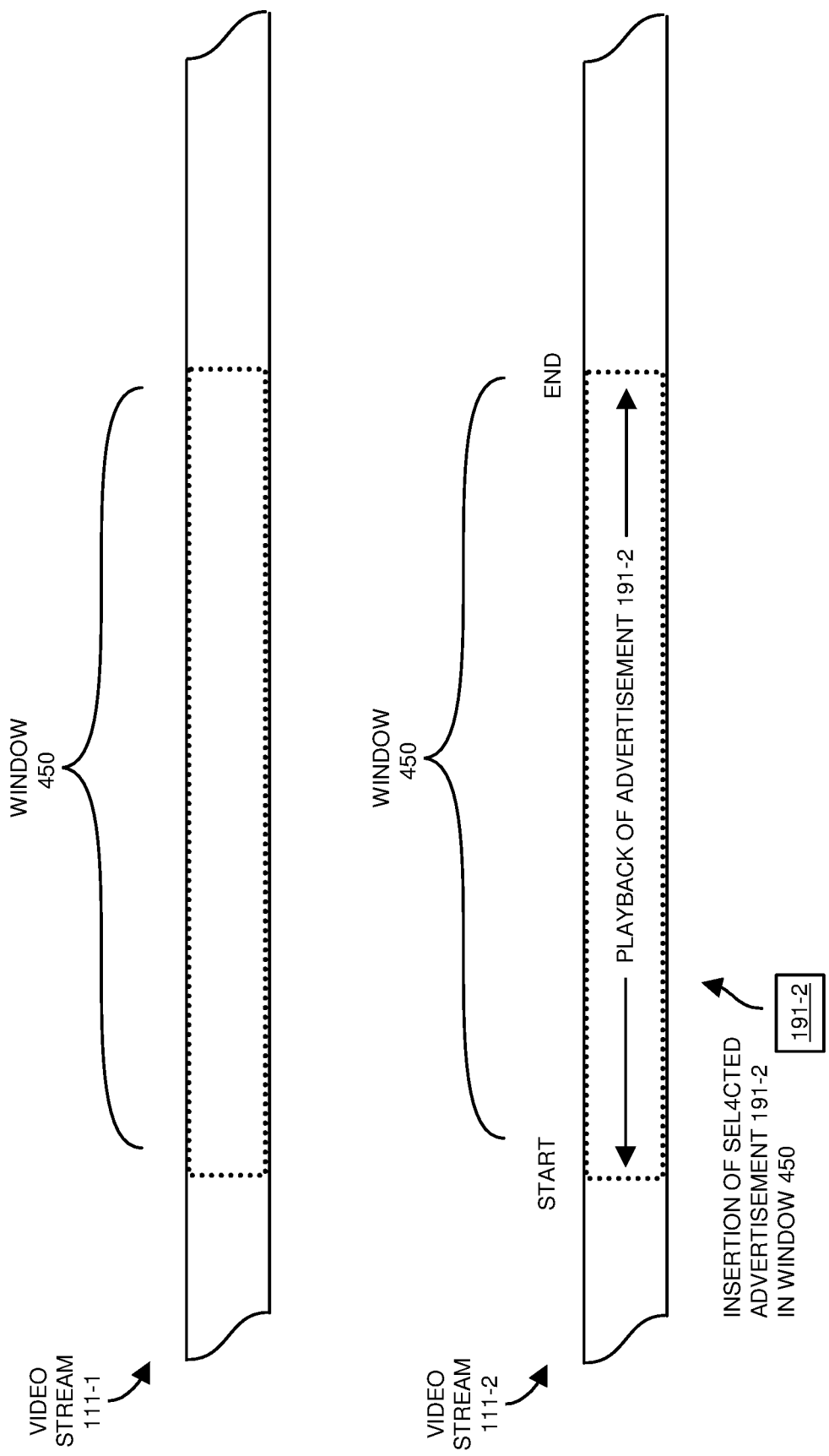
FIG. 4 is an example diagram illustrating insertion of an advertisement in a video stream according to embodiments herein.

FIG. 4 is an example diagram illustrating insertion of a first advertisement in a video stream according to embodiments herein.

As previously discussed, the video stream 111-1 received by the advertisement insertion resource 138 includes a respective window 450 in which to insert a selected advertisement 191-2. As previously discussed, assume that the advertisement management resource 145 selects advertisement 191-2 for insertion in the window 450. In such an instance, the content distribution resource 140 receives communications 125 from advertisement management resource 145 indicating to use the advertisement 191-2 for insertion in the respective window 450. Content distribution resource 140 notifies, via communications 126, the advertisement insertion resource 138 to insert the advertisement 191-2 in the window 450. In accordance with the notification, the advertisement insertion resource 138 inserts advertisement 191-2 in the window 450 of video stream 111-1 to produce video stream 111-2 for distribution over shared communication link 165 to the corresponding subscriber domains 170 operated to receive video stream 111-2.

Figure 5:
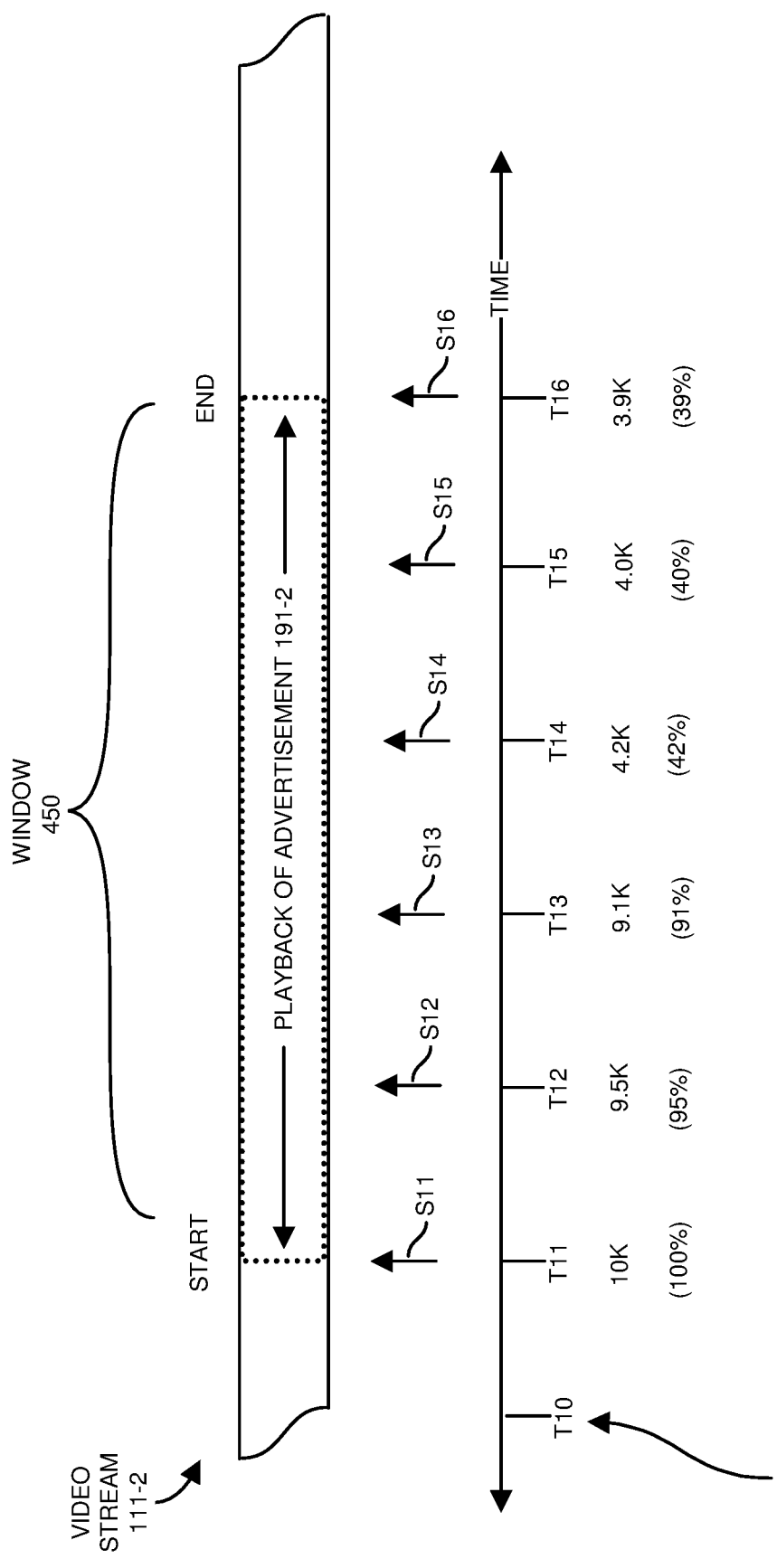
FIG. 5 is an example diagram illustrating insertion of a first advertisement in a video stream and monitoring of viewer responses according to embodiments herein.

FIG. 5 is an example diagram illustrating insertion of a first advertisement in a video stream and monitoring of viewer responses according to embodiments herein.

In this example embodiment, the content distribution resource 140 inserts selected advertisement 191-2 in window 450 as selected by the advertisement management resource 145. Content distribution resource 140 notifies (via communications 127) monitor resource 150 to monitor whether the advertisement 191-2 in window 450 is well received (liked or not) by respective viewers.

In response to receiving notification to monitor viewer interest via communications 127, the monitor resource 150 notifies (via communications 128) the network management resource 160 to monitor further viewing of the video stream 111-2 by the respective subscriber domains 170. In one embodiment, the communications 128 includes a request for tracking how many processing block devices in a respective advertisement zone tune to the video stream 111.

For example, the network management resource 160 constantly receives feedback 129 from the subscriber domains to produce current channel selection information. In one embodiment, the feedback 129 indicates control commands applied to respective communication devices (such as set top boxes or playback devices) in the subscriber domains receiving the video stream 111. Via updating of channel selection information 162 derived from feedback 129, and generation of log information 163, network management resource 160 stores a respective status of whether the subscriber domains originally receiving the video stream 111 at the start of the window 450 discontinue tuning to receive the video stream 111 during subsequent streaming of the advertisement in window 450 over the shared communication link 165.

More specifically, in one embodiment, the network management resource 160 samples the channel selection information 162 or feedback 129 indicating which of the viewers or subscriber domains 170 are still tuned to receive video stream 111.

As shown, at sample time T11, the network management resource 160 detects via sample S11 that 10,000 subscriber domains or viewers in network environment 100 receive the video stream 111 over the shared communication link 165.

At time T12, the network management resource 160 detects via sample S12 that 9,500 subscriber domains (95% of the original subscriber domains viewing at time T11 still receive video stream 111 at time T12; 5% of viewers discontinue receiving the video stream 111) in network environment 100 receive the video stream 111 over the shared communication link 165.

At time T13, the network management resource 160 detects via sample S13 that 9,100 subscriber domains (91% of the original subscriber domains viewing at time T11 still receive video stream 111 at time T13, 4% more of the original viewers discontinue receiving the video stream 111) in network environment 100 receive the video stream 111 over the shared communication link 165.

At time T14, the network management resource 160 detects via sample S14 that 4,200 subscriber domains (42% of the original subscriber domains viewing at time T11 still receive video stream 111 at time T14, 49% more of the original viewers discontinue receiving the video stream 111) in network environment 100 receive the video stream 111 over the shared communication link 165.

At time T15, the network management resource 160 detects via sample S15 that 4,000 subscriber domains (40% of the original subscriber domains viewing at time T11 still receive video stream 111 at time T15, 2% more of the original viewers discontinue receiving the video stream 111) in network environment 100 receive the video stream 111 over the shared communication link 165.

At time T16, the network management resource 160 detects via sample S16 that 3,900 subscriber domains (39% of the original subscriber domains viewing at time T11 still receive video stream 111 at time T16, 1% more of the original viewers discontinue receiving the video stream 111) in network environment 100 receive the video stream 111 over the shared communication link 165.

In one embodiment, network management resource 160 stores the sample information as log information 163. Network management resource 160 communicates the log information 163 to monitor resource 150. Monitor resource 150, in turn, communicates the log information 163 to advertisement management resource 145.

Via the log information 163, the advertisement management resource 145 is able to identify whether viewers liked the respective advertisement. For example, in this instance, because the viewing of the advertisement 191-2 experienced a sharp drop off (high rate of viewers discontinuing retrieval or receipt of the video stream 111 during the window 450), it can be assumed that the respective viewers in the subscriber domains viewing video stream 111 did not like or were not interested in the advertisement 191-2 in window 450. Accordingly, the sponsor of the respective advertisement 191-2 is notified of whether or not the advertisement 191-2 was effective.

Note that as an alternative to receiving feedback indicating a number of playback devices tune to the video stream during the window, the network management resource 160 can be configured to notify the monitor resource 150 of the network addresses (such as MAC addresses of the playback devices instead of a count value. Using such information to generate the log information 163, it is possible to track which subscriber domains are receptive to viewing the selected advertisement being played back.

Figure 6:
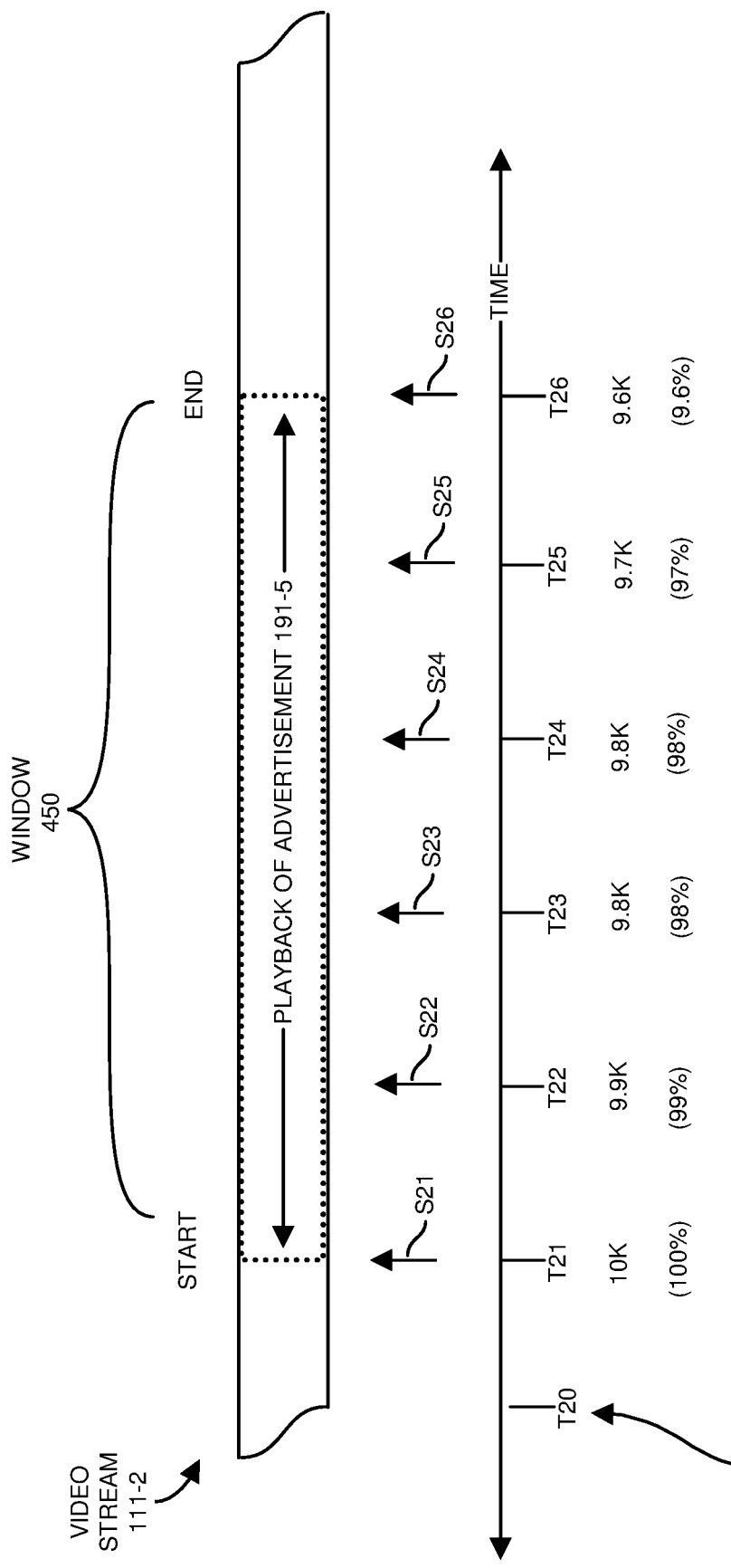
FIG. 6 is an example diagram illustrating insertion of a second advertisement in a video stream and monitoring of viewer responses according to embodiments herein.

FIG. 6 is an example diagram illustrating insertion of a second advertisement in a video stream and monitoring of viewer responses according to embodiments herein.

In this example embodiment, the content distribution resource 140 inserts selected advertisement 191-5 in window 450 as selected by the advertisement management resource 145. Content distribution resource 140 notifies (via communications 127) monitor resource 150 to monitor whether the advertisement 191-5 in window 450 is well received (liked or not) by respective viewers.

In response to receiving notification to monitor viewer interest via communications 127, the monitor resource 150 notifies (via communications 128) the network management resource 160 to monitor further viewing of the video stream 111-2 by the respective subscriber domains 170.

For example, the network management resource 160 receives feedback 129 from the subscriber domains. In one embodiment, the feedback 129 indicates control commands applied to respective communication devices (such as set top boxes, web browsers, etc., for the playback devices) in the subscriber domains receiving the video stream 111.

Via channel selection information 162 derived from feedback 129, network management resource 160 generates log information 163 indicates a status of whether the subscriber domains originally receiving the video stream 111 at the start of the window 450 discontinue tuning to receive the video stream 111 during subsequent streaming of the advertisement in window 450 over the shared communication link 165.

More specifically, in one embodiment, the network management resource 160 samples the channel selection information 162 or feedback 129 indicating which of the viewers or subscriber domains 170 are still tuned to receive video stream 111 to produce log information 163 (viewing report).

As shown, at time T21, the network management resource 160 detects via sample S21 that 10,000 subscriber domains in network environment 100 initially receive the video stream 111 and corresponding advertisement 191-5 over the shared communication link 165.

At time T22, the network management resource 160 detects via sample S22 that 9,900 subscriber domains (99% of the original subscriber domains viewing at time T21 still receive video stream 111 at time T22; 1% of viewers discontinue receiving the video stream 111) in network environment 100 receive the video stream 111 over the shared communication link 165.

At time T23, the network management resource 160 detects via sample S23 that 9,800 subscriber domains (98% of the original subscriber domains viewing at time T21 still receive video stream 111 at time T23, 1% more of the original viewers discontinue receiving the video stream 111) in network environment 100 receive the video stream 111 over the shared communication link 165.

At time T24, the network management resource 160 detects via sample S24 that 9,800 subscriber domains (98% of the original subscriber domains viewing at time T21 still receive video stream 111 at time T14, 0% more of the original viewers discontinue receiving the video stream 111) in network environment 100 receive the video stream 111 over the shared communication link 165.

At time T25, the network management resource 160 detects via sample S25 that 9,700 subscriber domains (97% of the original subscriber domains viewing at time T21 still receive video stream 111 at time T25, 1% more of the original viewers discontinue receiving the video stream 111) in network environment 100 receive the video stream 111 over the shared communication link 165.

At time T26, the network management resource 160 detects via sample S26 that 9,600 subscriber domains (96% of the original subscriber domains viewing at time T26 still receive video stream 111 at time T26, 1% more of the original viewers discontinue receiving the video stream 111) in network environment 100 receive the video stream 111 over the shared communication link 165.

In one embodiment, network management resource 160 stores the sample information as log information 163. Network management resource 160 communicates the log information 163 to monitor resource 150. Monitor resource 150, in turn, communicates the log information 163 to advertisement management resource 145.

Via the log information 163, the advertisement management resource 145 is able to identify whether viewers liked the respective advertisement 191-5. For example, in this instance, because the viewing of the advertisement 191-5 experienced a very little drop off (low rate of viewers discontinuing retrieval or receipt of the video stream 111 during the window 450), it can be assumed that the respective viewers in the subscriber domains did like or were interested in the advertisement 191-5. Accordingly, the sponsor of the respective advertisement 191-5 is notified of whether or not the advertisement 191-5 was effective.

In one embodiment, log information 163 produced by network management resource 160 or other suitable resource includes a metric or metrics indicating viewer details such as: i) how many of the communication devices discontinues receiving the video stream 111 during the window of time 450; ii) a rate at which the multiple communication devices in subscriber domains discontinue receiving the video stream 111 during the window of time 450, etc.

Such viewer metrics generated by the network management resource 160 (monitor resource) or other suitable resource can include a first metric (sample information S21 indicating that 10,000 subscriber domains receive the video stream 111 at time T21), a second metric (sample information S22 indicating that 9,900 subscriber domains receive the video stream 111 at time T22), (sample information S23 indicating that 9,800 subscriber domains receive the video stream 111 at time T21), and so on. In such an instance, the first metric indicates how many of the communication devices (subscriber domains) receiving the video stream 111 at the beginning of the window 450 continues to receive the video stream 111 at a first instant in time (T22) in the window. The second metric indicates how many of the communication devices (subscriber domains) receiving the video stream 111 at the beginning of the window 450 continues to receive the video stream 111 at a second instant in time (T23) in the window. The third metric indicates how many of the communication devices (subscriber domains) receiving the video stream 111 at the beginning of the window 450 continues to receive the video stream 111 at a third instant in time (T24) in the window, and so on.

As previously discussed, the generated metrics (log information 163) can be used as a basis in which to control subsequent transmission of the advertisement over the channel. For example, if it is known that viewers watching a video stream have a high rate (such as above a threshold value) of changing to a different channel based on advertisement 191-2, it is known that the corresponding advertisement 191-2 communicated in the window is undesirable. Conversely, if it is known that viewers watching a video stream have a low rate (such as below a threshold value) of changing to a different channel based on advertisement 191-5, it is known that the corresponding advertisement 191-5 communicated in the window is desirable.

Referring again to FIG. 6, note that sampling of the number of viewers continuing to receive the advertisements in the respective window of the video stream 111 can be used to identify which portions of the advertisement are undesirable. For example, the sharp drop-off in viewing of advertisement 191-2 between time T13 and time T14 indicates that a portion of content at or around time T13 is very undesirable.

Figure 7:
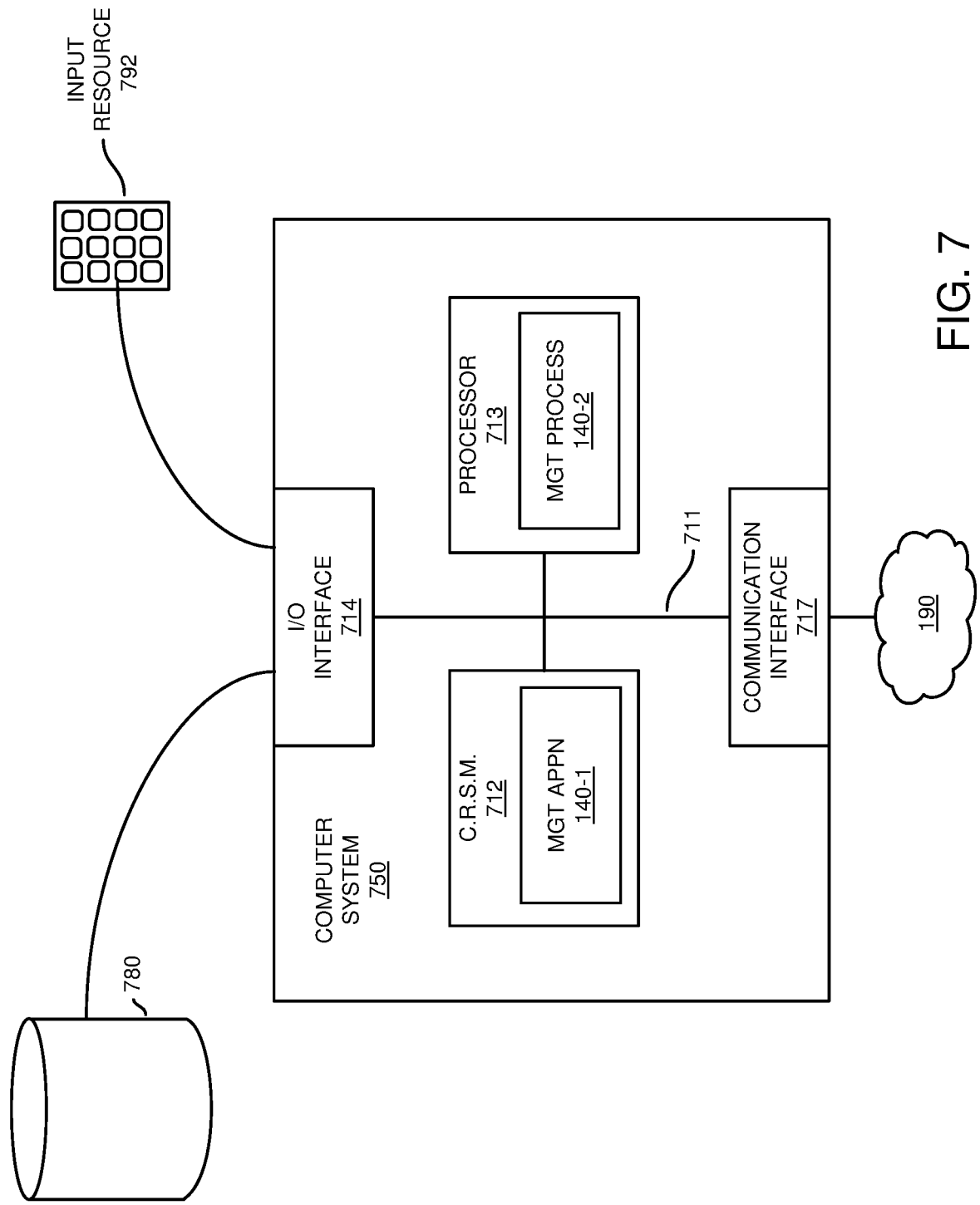
FIG. 7 is an example diagram illustrating example computer architecture operable to execute one or more operations according to embodiments herein.

FIG. 7 is an example block diagram of a computer system for implementing any of the operations as previously discussed according to embodiments herein.

Any of the resources (such as content source 105, video stream management resource 135, content distribution resource 140, advertisement management resource 145, monitor resource 150, network management resource 160, etc.) as discussed herein can be configured to include computer processor hardware, analog/digital circuitry, and/or corresponding executable instructions to carry out the different operations as discussed herein.

As shown, computer system 750 of the present example includes an interconnect 711 that couples computer readable storage media 712 such as a non-transitory type of media (i.e., any type of hardware storage medium) in which digital information can be stored and retrieved, a processor 713, I/O interface 714, and a communications interface 717.

I/O interface(s) 714 supports connectivity to repository 770 and input resource 792.

Computer readable storage medium 712 can be any hardware storage device such as memory, optical storage, hard drive, floppy disk, etc. In one embodiment, the computer readable storage medium 712 stores instructions and/or data.

As shown, computer readable storage media 712 can be encoded with management application 140-1 (e.g., including instructions) to carry out any of the operations as discussed herein.

During operation of one embodiment, processor 713 accesses computer readable storage media 712 via the use of interconnect 711 in order to launch, run, execute, interpret or otherwise perform the instructions in management application 140-1 stored on computer readable storage medium 712. Execution of the management application 140-1 produces management process 140-2 to carry out any of the operations and/or processes as discussed herein.

Those skilled in the art will understand that the computer system 750 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 750 may reside at any location or can be included in any suitable resource in any network environment to implement functionality as discussed herein.

Functionality supported by the different resources will now be discussed via flowcharts in FIGS. 8-10. Note that the steps in the flowcharts below can be executed in any suitable order.

Figure 8:
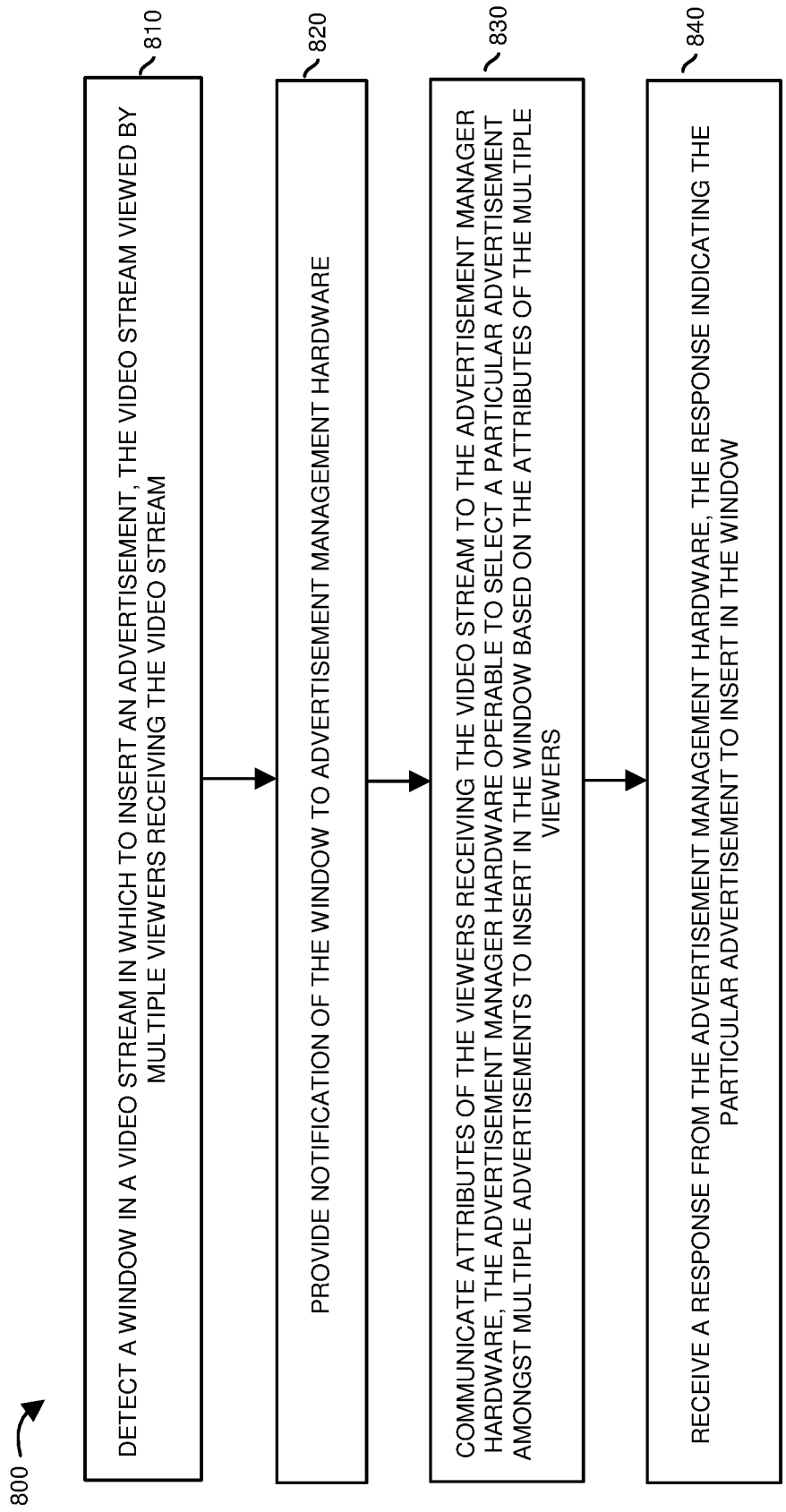

FIG. 8 is a flowchart 800 illustrating an example method according to embodiments herein. Note that there will be some overlap with respect to concepts as discussed above.

In processing operation 810, via communication 121 from the video stream monitor resource 135, content distribution resource 140 detects a window 450 in a video stream 111-1 in which to insert an advertisement. Multiple viewers in respective subscriber domains 170 receive and view the video stream 111-2.

In processing operation 820, content distribution hardware 140 provides notification of the window 450 to advertisement management resource 145.

In processing operation 830, the content distribution hardware 140 identifies attributes of the viewers receiving the video stream 111-2.

In processing operation 840, the advertisement management resource 145 selects a particular advertisement 191-2 amongst multiple advertisements 191 to insert in the window 450 based on the attributes of the multiple viewers.

In processing operation 850, the content distribution resource 126 notifies the advertisement insertion resource 138 to insert the particular advertisement 191-2 (or other selected advertisement) in the window 450.

Figure 9:
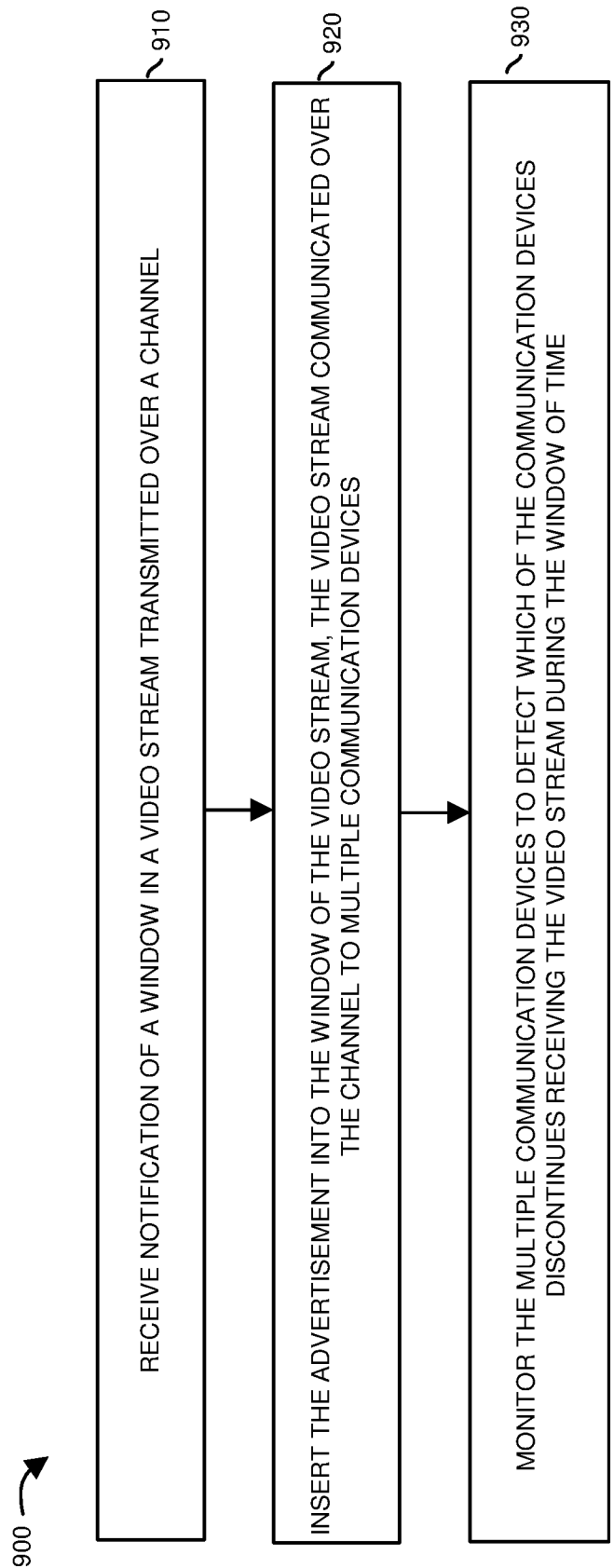

FIG. 9 is a flowchart 900 illustrating an example method according to embodiments herein. Note that there will be some overlap with respect to concepts as discussed above.

In processing operation 910, the content distribution resource 140 receives notification (via communication 125) of an advertisement 191-2 to insert in a window 450 of a video stream 111 transmitted over a channel of shared communication link 165.

In processing operation 920, the content distribution resource 140 notifies the advertisement insertion resource 138 to insert the advertisement 191-2 into the window 450 of the video stream 111. The video stream 111 is communicated over the channel to multiple communication devices in subscriber domains 170.

In processing operation 930, the network management resource 160 monitors the multiple communication devices in subscriber domains 170 to detect which of the communication devices (and/or subscriber domains) discontinue receiving the video stream 111 during the window of time 450.

FIG. 10 is a flowchart 1000 illustrating an example method according to embodiments herein. Note that there will be some overlap with respect to concepts as discussed above.

In processing operation 1010, the content distribution resource 140 detects upcoming window 450 of a video stream 111 in which to insert an advertisement.

In processing operation 1020, the network management resource 160 determines identities of viewers (such as subscriber domains 170, users, subscribers, communication devices, etc.) receiving the video stream 111.

In processing operation 1030, based on the identities, the network management resource 160 identifies attributes (such as profiles, viewer information, etc.) of the viewers in subscriber domains 170 receiving the video stream 111.

In processing operation 1040, the advertisement management resource 145 selects a particular advertisement 191-2 amongst multiple advertisements 191 to insert in the window 450 based on the attributes of the multiple viewers in subscriber domains 170.

In processing operation 1050, the content distribution hardware 140 notifies the advertisement insertion resource 138 to insert the particular advertisement 191-2 in the window 450-1.

Note again that techniques herein are well suited to facilitate improved use of bandwidth to distribute advertisements and monitor same. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   detecting a window in a video stream in which to insert an advertisement, the video stream viewed by multiple viewers currently receiving the video stream;
   providing notification of the window to advertisement management hardware;
   communicating attributes of the multiple viewers receiving the video stream to the advertisement management hardware, the advertisement management hardware operable to select a particular advertisement amongst multiple advertisements to insert in the window based on the attributes of the multiple viewers; and
   receiving a response from the advertisement management hardware, the response indicating the particular advertisement to insert in the window;
   wherein the video stream is transmitted over a first channel to which the multiple viewers are tuned, the method further comprising:
   inserting the particular advertisement in the window of the video stream; and
   monitoring subsequent tuning commands by the multiple viewers during the window in which the particular advertisement is inserted.

2. A method comprising:
   detecting a window in a video stream in which to insert an advertisement, the video stream viewed by multiple viewers currently receiving the video stream;
   providing notification of the window to advertisement management hardware;
   communicating attributes of the multiple viewers receiving the video stream to the advertisement management hardware, the advertisement management hardware operable to select a particular advertisement amongst multiple advertisements to insert in the window based on the attributes of the multiple viewers;
   receiving a response from the advertisement management hardware, the response indicating the particular advertisement to insert in the window;
   wherein the video stream is a title of content transmitted over a shared communication link; and
   wherein the attributes of the multiple viewers are communicated to the advertisement management hardware during transmission of the title of content over the shared communication link.

3. The method as in claim 2 further comprising:
   detecting identities of the multiple viewers receiving the video stream;
   mapping identities of the multiple viewers to multiple profiles assigned to the multiple viewers; and
   utilizing the multiple profiles to identify the attributes of the multiple viewers.

4. The method as in claim 3, wherein the video stream is transmitted over a first channel to which the multiple viewers are tuned, the method further comprising:
   inserting the particular advertisement in the window of the video stream; and
   monitoring subsequent tuning commands by the multiple viewers during the window in which the particular advertisement is inserted.

5. The method as in claim 1 further comprising:
   while transmitting the particular advertisement in the video stream to the multiple viewers over the first channel, monitoring which of the multiple viewers discontinues tuning to the first channel to receive the video stream.

6. The method as in claim 5 further comprising:
   producing viewer information indicating a portion of the multiple viewers that receive the particular advertisement over the first channel in its entirety.

7. The method as in claim 6 further comprising:
   communicating the viewer information to an advertisement sponsor that pays a fee to distribute the particular advertisement over the first channel.

8. The method as in claim 1 further comprising:
   subsequent to detecting the window and prior to occurrence of the window in the video stream: collecting and communicating the attributes of the multiple viewers to the advertisement management hardware.

9. The method as in claim 1, wherein the first channel over which the advertisement is transmitted is a linear broadcast channel allocated for distribution of the video stream over a shared communication link to multiple communication devices operated by the multiple viewers.

10. The method as in claim 1, wherein the attributes of the multiple viewers is selected from the group consisting of:
    i) number of subscribers tuned to receive the video stream,
    ii) a profile of a geographical region in which the multiple viewers reside, and
    iii) profiles of the multiple viewers operating communication devices tuned to the video stream.

11. The method as in claim 1, wherein the attributes of the multiple viewers includes: i) a numerical value indicating a number of the multiple viewers in a network environment that are tuned to receive the video stream, and ii) profiles of the multiple viewers indicating their interests.

12. The method as in claim 1, wherein the attributes communicated to the advertisement management hardware indicates a dominant type of viewer profile of the multiple viewers; and wherein the advertisement management hardware is operable to use the dominant type of viewer profile as a basis to select the particular advertisement.

13. The method as in claim 1, wherein the advertisement management hardware is operable to select the particular advertisement based on a collection of viewer profiles assigned to the multiple viewers, each of the viewer profiles specifying multiple different video genres of interest associated with a respective subscriber domain to which a corresponding profile pertains; and wherein the advertisement management hardware is operable to identify a dominant profile type via the viewer profiles and use the identified dominant profile type as a basis to select the particular advertisement.

14. A method comprising:

receiving notification of an advertisement to insert in a window of time of a video stream transmitted over a channel;

inserting the advertisement into the window of time of the video stream, the video stream communicated over the channel to multiple communication devices;

monitoring each of the multiple communication devices to detect which of the multiple communication devices discontinues receiving the video stream during the window of time; and the method further comprising: producing a metric indicating a rate at which the multiple communication devices discontinue receiving the video stream during the window of time.

15. The method as in claim 14, wherein the metric is a first metric, the method further comprising:

producing a second metric indicating how many of the multiple communication devices discontinues receiving the video stream during the window of time.

16. A method comprising:

receiving notification of an advertisement to insert in a window of time of a video stream transmitted over a channel;

inserting the advertisement into the window of time of the video stream, the video stream communicated over the channel to multiple communication devices; and monitoring each of the multiple communication devices to detect which of the multiple communication devices discontinues receiving the video stream during the window of time;

wherein tracking which of the multiple communication devices discontinues receiving the video stream during the window of time includes:

producing multiple metrics including a first metric and a second metric, the first metric indicating how many of the communication devices receiving the video stream at the beginning of the window continues to receive the video stream at a first instant in time in the window of time, the second metric indicating how many of the communication devices receiving the video stream at the beginning of the window continues to receive the video stream at a second instant in time in the window of time.

17. The method as in claim 14, wherein the metric is a first metric, the method further comprising:

producing a second metric indicating a degree of interest of viewers viewing the advertisement in the window of the video stream based on an amount of the communication devices that discontinue receiving the advertisement during the window of time in the video stream.

18. The method as in claim 17 further comprising:

utilizing the second metric as a basis in which to control subsequent transmission of the advertisement over the channel.

19. A system comprising:

monitor hardware operable to monitor for presence of a window in a video stream in which to insert an advertisement, the video stream viewed by multiple viewers tuned to receive the video stream; and content distribution hardware operable to:

i) identify attributes of the multiple viewers receiving the video stream;

ii) select a particular advertisement amongst multiple advertisements to insert in the window based on the attributes of the multiple viewers; and iii) insert the particular advertisement in the window; the content distribution hardware further operative to:

at different times during the window of streaming the particular advertisement, track which of the multiple viewers are still tuned to receive the video stream; and produce a report indicating a rate at which the multiple viewers discontinue receiving the particular advertisement during the window of time.

20. The system as in claim 19, wherein the video stream is a title of content transmitted over a shared communication link; and wherein the content distribution hardware identifies the attributes of the multiple viewers during transmission of the title of content over the shared communication link.

21. The system as in claim 20, wherein the content distribution management hardware is further operable to:

detect identities of the multiple viewers receiving the video stream;

map the identities of the multiple viewers to multiple profiles assigned to the multiple viewers; and utilize the multiple profiles to identify the attributes of the multiple viewers.

22. The system as in claim 19, wherein the video stream is transmitted over a first channel to which the multiple viewers are tuned, the content distribution hardware further operable to:

monitor subsequent tuning commands by the multiple viewers during the window in which the particular advertisement is inserted.

23. The system as in claim 19, wherein the content distribution hardware is further operable to:

monitor which of the multiple viewers discontinues tuning to the channel to receive the video stream while transmitting the particular advertisement in the video stream to the multiple viewers.

24. The system as in claim 19, wherein the content distribution hardware is further operable to: identify the attributes of the multiple viewers subsequent to detecting the window and prior to occurrence of the window in the video stream.

25. The system as in claim 19, wherein a channel over which the video stream is transmitted is a linear broadcast channel of a shared communication link.

26. The system as in claim 19, wherein the attributes of the multiple viewers includes: i) a numerical value indicating a number of the multiple viewers in the network environment that are tuned to receive the video stream, and ii) profiles of the multiple viewers indicating their interests.

27. The system as in claim 19, wherein the attributes communicated to the advertisement management hardware indicates a dominant type of viewer profile of the multiple viewers; and wherein the content distribution hardware is operable to use the dominant type of viewer profile as a basis to select the particular advertisement.

28. The system as in claim 19, wherein the content distribution hardware is operable to select the particular advertisement based on a collection of viewer profiles assigned to the multiple viewers.

29. Computer-readable storage hardware having instructions stored thereon, the instructions, when carried out by computer processor hardware, cause the computer processor hardware to:

detect a window in a video stream in which to insert an advertisement, the video stream viewed by multiple viewers receiving the video stream;

provide notification of the window to advertisement management hardware;

communicate attributes of the viewers receiving the video stream to the advertisement manager hardware, the advertisement manager hardware operable to select a particular advertisement amongst multiple advertisements to insert in the window based on the attributes of the multiple viewers; and receive a response from the advertisement management hardware, the response indicating the particular advertisement to insert in the window;

at different times during the window of streaming the advertisement, track which of the multiple viewers are still tuned to receive the video stream; and produce a report indicating a rate at which the multiple viewers discontinue receiving the advertisement during the window of time.

30. The method as in claim 1 further comprising:
at different times during the window of streaming the particular advertisement, tracking which of the multiple viewers are still tuned to receive the video stream.

31. A method comprising:
detecting a window in a video stream in which to insert an advertisement, the video stream viewed by multiple viewers currently receiving the video stream;

providing notification of the window to advertisement management hardware;

communicating attributes of the multiple viewers receiving the video stream to the advertisement management hardware, the advertisement management hardware operable to select a particular advertisement amongst multiple advertisements to insert in the window based on the attributes of the multiple viewers; and receiving a response from the advertisement management hardware, the response indicating the particular advertisement to insert in the window;

at different times during the window of streaming the advertisement, tracking which of the multiple viewers are still tuned to receive the video stream; and producing a report indicating a rate at which the multiple viewers discontinue receiving the advertisement during the window of time.

32. The method as in claim 1 further comprising:
during the window, monitoring video control commands applied to video playback devices playing back the particular advertisement to the multiple viewers, the video playback devices controlled by the multiple viewers; and producing a report indicating a status of the multiple viewers receiving the particular advertisement during the window.

33. The method as in claim 32, wherein the report indicates how many of the video playback devices receiving the video stream at a start of the window discontinue viewing the video stream by an end of the window.

34. The method as in claim 1 further comprising:
at different instants of time, tracking which of multiple communication devices operated by the multiple viewers discontinues receiving the particular advertisement during the window.

35. A method comprising:
detecting a window in a video stream in which to insert an advertisement, the video stream viewed by multiple viewers currently receiving the video stream;

providing notification of the window to advertisement management hardware;

communicating attributes of the multiple viewers receiving the video stream to the advertisement management hardware, the advertisement management hardware operable to select a particular advertisement amongst multiple advertisements to insert in the window based on the attributes of the multiple viewers;

receiving a response from the advertisement management hardware, the response indicating the particular advertisement to insert in the window; at different instants of time, tracking which of multiple communication devices operated by the multiple viewers discontinues receiving the advertisement during the window; and producing multiple metrics including a first metric and a second metric, the first metric indicating how many of the multiple communication devices receiving the video stream at the beginning of the window continues to receive the video stream at a first instant in time in the window, the second metric indicating how many of the communication devices receiving the video stream at the beginning of the window continues to receive the video stream at a second instant in time in the window.

36. The method as in claim 1 further comprising:
during the window, monitoring video control commands applied to video playback devices playing back the particular advertisement in the video stream, the video playback devices controlled by the multiple viewers, the particular advertisement including different portions; and based on the video control commands, producing a report indicating a desirability of each of the different portions of the particular advertisement in the window of time.

37. The method as in claim 1 further comprising:
during the window, receiving feedback indicating playback control commands applied by the multiple viewers controlling playback of the particular advertisement; and based on the feedback, producing a report indicating different levels of desirability associated with different portions of the particular advertisement.

38. The method as in claim 14 further comprising:
during the window of time, monitoring video control commands applied to the multiple communication devices playing back the particular advertisement to multiple viewers, the multiple communication devices controlled by the multiple viewers; and producing a report indicating a status of the multiple viewers receiving the advertisement during the window.

39. The method as in claim 1 further comprising:
during the window of time, receiving feedback indicating playback of the particular advertisement at the multiple communication devices; and
based on the feedback, producing a report indicating different levels of desirability associated with different portions of the particular advertisement.

\* \* \* \* \*